United States Patent
Schmidt

(10) Patent No.: US 6,802,211 B2
(45) Date of Patent: Oct. 12, 2004

(54) METHOD AND DEVICE FOR DETERMINING A BASIC VALUE OF AT LEAST ONE MEASURED QUANTITY OF A BRAKE SYSTEM

(75) Inventor: Hanniel Schmidt, Karlsbad (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/871,217

(22) Filed: May 31, 2001

(65) Prior Publication Data

US 2001/0047684 A1 Dec. 6, 2001

(30) Foreign Application Priority Data

Jun. 3, 2000 (DE) .......................................... 100 27 667

(51) Int. Cl.$^7$ ............................................. G01M 15/00
(52) U.S. Cl. ....................................................... 73/121
(58) Field of Search .......................... 73/121–132, 1.11; 701/83

(56) References Cited

U.S. PATENT DOCUMENTS 4,920,493 A * 4/1990 Brearley et al. ............... 701/70
5,717,134 A * 2/1998 Schlichenmaier et al. .. 340/453

FOREIGN PATENT DOCUMENTS

DE 198 07 369 8/1999

\* cited by examiner

*Primary Examiner*—Eric S. McCall
(74) *Attorney, Agent, or Firm*—Kenyon & Kenyon

(57) ABSTRACT

A method and a device for determining at least one basic value of at least one measured quantity of a brake system. At the start of the system, the measured quantity prevailing at that time is then assumed as the basic value.

15 Claims, 5 Drawing Sheets

METHOD AND DEVICE FOR DETERMINING A BASIC VALUE OF AT LEAST ONE MEASURED QUANTITY OF A BRAKE SYSTEM

BACKGROUND INFORMATION

Modern brake systems are usually controlled electronically. Therefore, various measured values are detected in the area of the brake system, including, for example, the wheel brake pressures, brake circuit pressures, driver intent signals such as pedal displacement, main cylinder displacements, admission pressures, etc. These measured quantities must be calibrated to a basic value to guarantee satisfactory control.

An electrically controlled brake system is described in German Patent Application No. 198 07 369, for example. In that patent, an intent to brake is deduced from the fact that the driver has operated the brake pedal and this is converted to setpoint brake pressures for the individual wheel brakes, taking into account additional operating quantities, if necessary. The setpoint brake pressures for the individual wheels or axles are regulated for each wheel or for each axle by pressure control circuits based on the respective setpoint pressure and the actual brake pressure measured in the area of the wheel brake. To determine the driver's intent to brake, a pedal displacement sensor is provided. However, no measures are described for calibrating at least one of the measured quantities.

SUMMARY OF THE INVENTION

When the system is started, an automatic determination of the basic values is made possible through the procedure described below. No manual adjustment is necessary.

It is especially advantageous that the basic values are determined only when the system is in a suitable state for this purpose.

Changes during operation of the vehicle, depending on temperature or aging, for example, are detected in an advantageous manner and the respective basic values are corrected.

DETAILED DESCRIPTION

Figure 1:
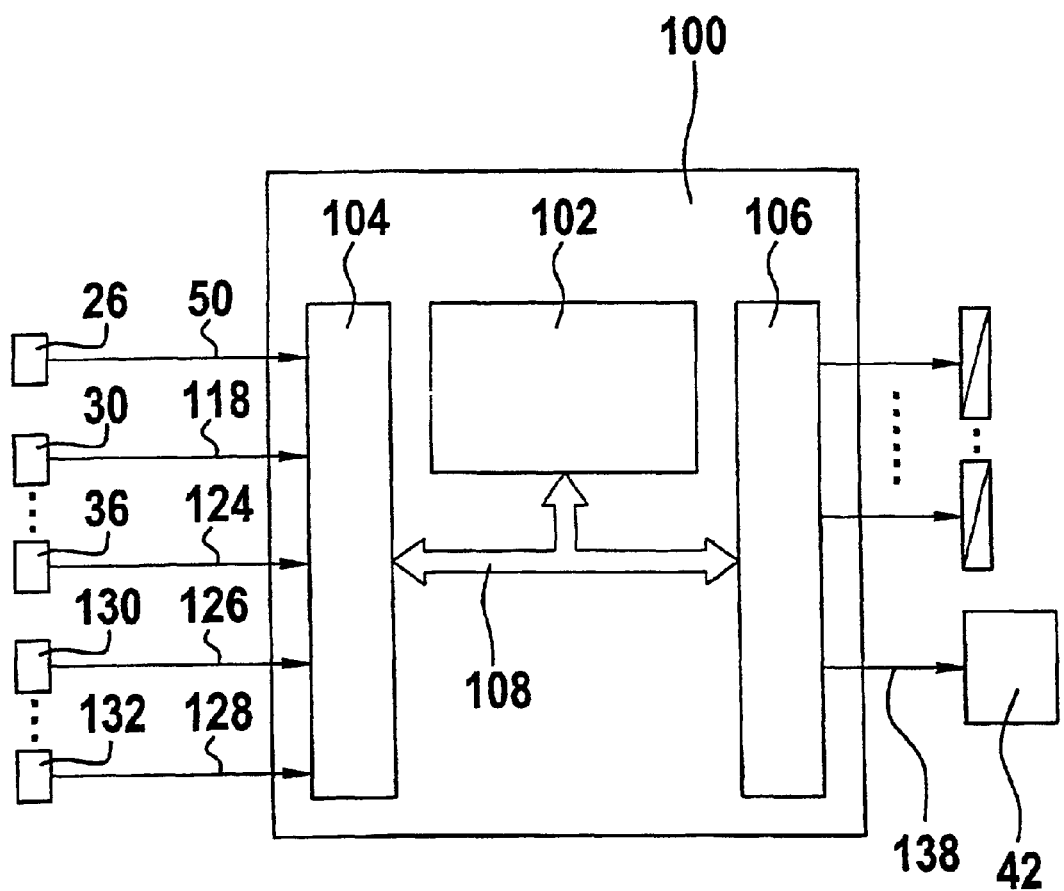
FIG. 1 shows a survey block diagram of a control unit for electric control of a brake system.

FIG. 1 shows a block diagram of a control unit for electric control of a brake system. Control unit 100 includes at least one microcomputer 102, an input circuit 104, an output circuit 106 and a bus system 108 connecting these elements for mutual data exchange. A line 50 leads from a pedal displacement sensor 26 to input circuit 104. Furthermore, input lines 118 through 124 connect input circuit 104 to sensors 30 through 36 which are provided for each wheel brake. Additional input lines 126 through 128 connect input circuit 104 to measurement devices 130 through 132 for detection of additional operating quantities of the brake system, the vehicle and/or its drive unit. Such operating quantities include, for example, the wheel speeds, optionally the engine torque delivered by the drive unit, loads per axle, the pressure in the brake line, etc. Several output lines are connected to output circuit 106. The output lines over which at least one valve of a pressure modulator is operated are shown as an example. A pump 42 is controlled over another output line 138. Control unit 100 controls the brake system as a function of the signal quantities supplied to it as described above.

Instead of determining the brake pedal displacement, other measurement devices are used in other embodiments to detect the displacement of an element of the main cylinder which is linked to the brake pedal, to detect the operating force or to determine a pressure in the area of the main cylinder.

If the driver depresses the brake pedal, then a quantity representing the extent of operation of the brake pedal is determined by sensor 26. Depending on this quantity, the driver's braking intent, representing a setpoint deceleration or a setpoint braking force, is determined with the aid of characteristic curves, engine characteristic maps, tables, or calculation steps. The individual setpoint wheel brake pressures are formed from this braking intent, the driver's braking intent being modified according to driving status and traction conditions. These setpoint wheel brake pressures are sent to pressure regulators where a relationship is established with the brake pressures measured on each wheel, and the valve arrangements at the individual wheel brakes are controlled so that the actual pressure approximates the respective setpoint pressure.

In other embodiments, the pressures in the brake circuits are regulated at predetermined setpoints instead of the brake pressures of the individual wheels. In this case, the conversion of the driver's braking intent into setpoint pressures boosts the braking force, so no additional brake booster is needed.

Instead of the brake system described above having pressure medium-operated actuators (hydraulic or pneumatic), wheel brake actuators that produce an electromechanical brake application in the wheel brake are used in other embodiments accordingly. Electric currents, braking forces, braking torques or the displacement of at least one movable element of the actuator representing a measure of the braking force exerted are determined on the wheel brakes. The setpoints formed from the driver's intent (here: braking forces, braking torques, currents, distances, etc.) are regulated accordingly.

In electric control it is essential that the driver's intent and/or the actual quantities be detected correctly. Therefore, this quantity or these quantities must be calibrated. In this connection, at least one basic value of the corresponding quantities is determined, in particular the value delivered by the respective sensor in a suitable operating mode. Such an operating mode exists, for example, when the brake pedal is completely released, i.e., there is no intent to brake on the part of the driver and/or there is no operation of the wheel brakes (e.g., due to other control functions).

A basic value which can be determined according to the procedure described below could also be a measured quantity value which occurs when the brake pedal is completely depressed or when maximum braking force is applied to the wheel brakes.

For calibration of at least one of these sensors, at least one threshold value is to be predetermined for the sensor signal. If the sensor signal is below this threshold value, then the signal prevailing at that time is set as the basic value, in particular as a zero value. Furthermore, another, higher threshold value is formed, in which case the signal prevailing at that time is used as the basic value, in particular as the zero value, if the sensor signal is between the first and second threshold values. Again in this case, where the brake pedal must be operated, the instantaneous value is assumed as the basic value, in particular a zero value.

If the sensor signal is above the second threshold value, which is the larger value, then no basic value is determined, and instead the basic value is derived from the stored value determined in a previous operating cycle.

During operation of the motor vehicle, the basic value is corrected if a negative value of the calibrated measured quantity is detected, taking into account the stored basic value. In this case, the basic value is determined again.

If a displacement sensor is used to determine the driver's braking intent, there is the special situation in which the driver retracts the pedal. Again in this case, the value prevailing at that time, although not representing the actual conditions, is assumed as the basic value. If the driver releases the pedal, so that it returns to its actual zero position, then a positive value is obtained for the displacement signal. If this value is above a limit value and below the first threshold value, then the basic value is determined again. In this way, positive drifts are also covered.

Simultaneously with or as an alternative to determination of the basic value of the braking intent signal value, the basic values of the actual value sensors are determined under the assumption that no braking action is currently taking place.

Figure 2:
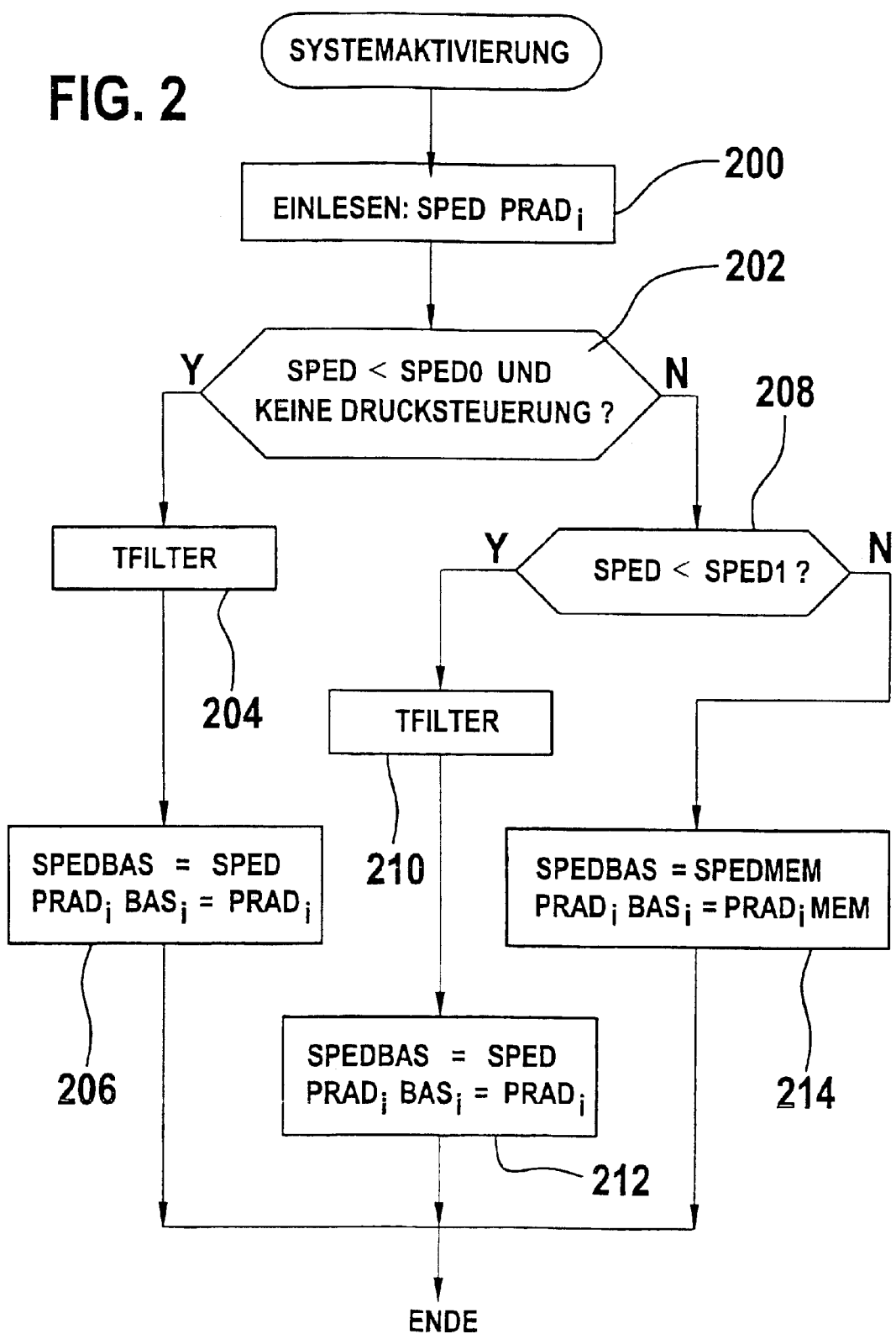
FIG. 2 illustrates a preferred embodiment on the basis of a first flow chart which represents the preferred implementation of the basic value determination in the form of a computer program.
Figure 3:
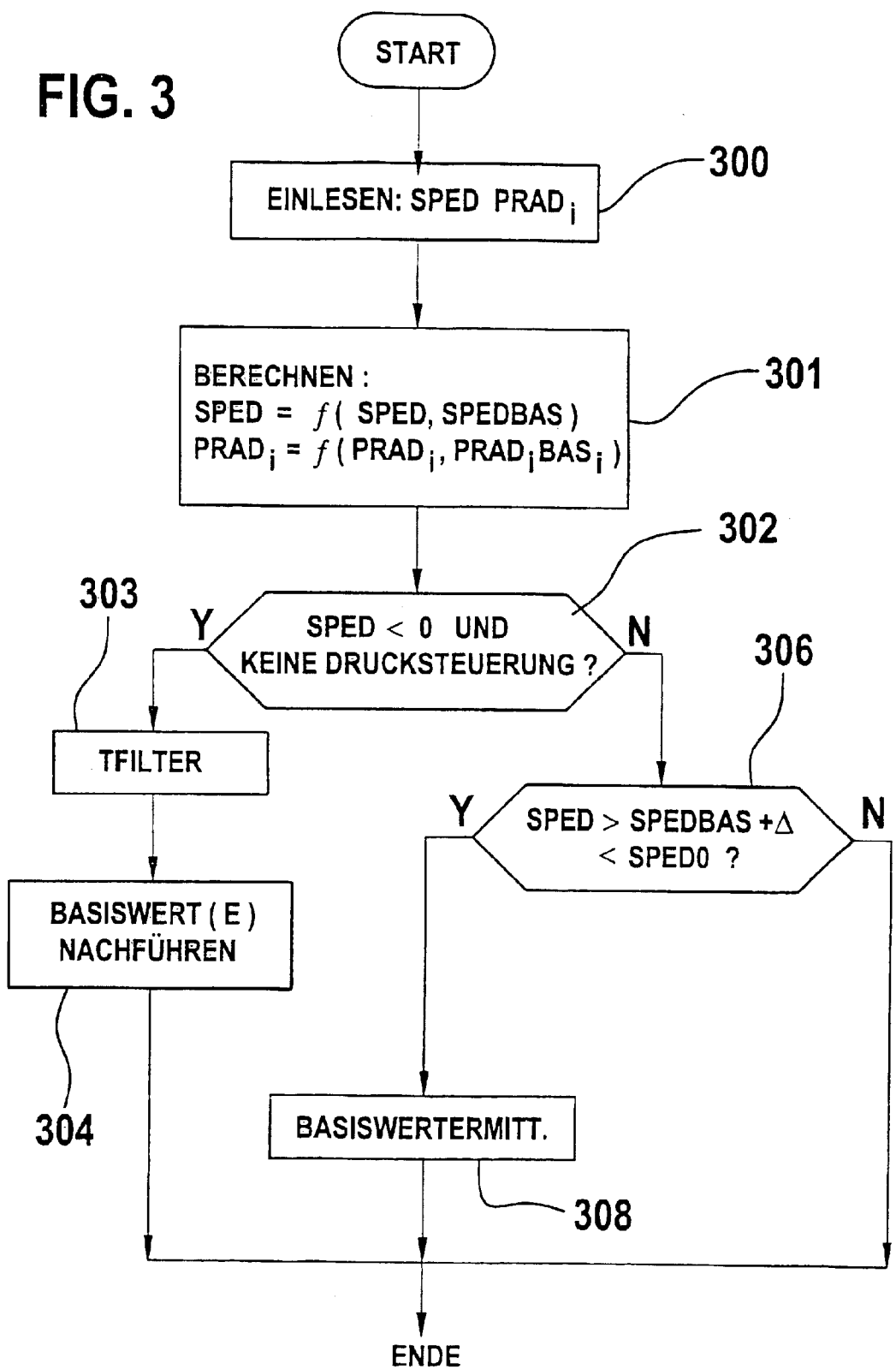
FIG. 3 shows a second flow chart.

A preferred embodiment is illustrated in the flow charts in FIGS. 2 and 3, where a quantity representing the operating displacement of the brake pedal is determined by a sensor. In the preferred embodiment, a displacement signal is determined in the area of the main cylinder, and if the corresponding conditions prevail, the circuit pressure signals or wheel brake pressure signals, in addition to the displacement signal, are also set at zero. In the preferred embodiment, the voltage of the displacement sensor is in the range between 0 V and 10 V, and the voltage of the pressure sensors is between −5 V and 5 V. The basic values or zero values represent the basis for regulation as well as for all other functions which analyze these signals. The sensor signal thus determined is weighted with the basic value, which corresponds to a sensor value of 0 which is determined and stored. Thus only the difference between the measurement signal and the basic value or the zero value is processed further as the useful sensor signal.

FIG. 2 illustrates the procedure on activation of the brake system, i.e., when the power supply voltage of control unit 100 is turned on. If this is the case, then in step 200, measured displacement signal Sped and wheel brake pressure signals Pradi or the circuit pressure signals are entered. Then in query step 202, a check is performed to determine whether displacement signal Sped is smaller than a predetermined first threshold value Sped0 and whether there is no pressure control, i.e., no control signals are being output to the wheel brake actuators. If this is the case, then a filter is activated in step 204, and after a filter time TFilter has elapsed, the basic values for displacement signal Spedbas and/or the wheel brake pressure signals or brake circuit pressure signals are determined and stored in step 206. The signal value applied at that time is determined as a prevailing basic value Spedbas. Then the program is terminated and loaded again the next time the system is activated.

The value of the displacement signal or the other measured quantities is 0 when the signal detected corresponds to the basic value. The measured quantity signal to be processed further is determined on the basis of the difference between the measured quantity signal detected and the basic value.

If it has been found in step 202 that one of the conditions prevailing there is not met, then in step 208 a check is performed to determine whether displacement signal Sped is smaller than a second threshold value Sped1. This second threshold value is greater than the first threshold value which is checked in step 202. It preferably amounts to about 80% of the total signal range. If this is the case, then in step 210 a filter is activated just as in step 204, and then, after the predetermined filter time has elapsed, which amounts to a few 10 ms to a few 100 ms in the preferred embodiment, basic values Spedbas are determined according to step 212 as described for step 206. If it is found in step 208 that the displacement signal detected is not less than the second threshold value, then according to step 214, stored basic value Spedbas is taken from a preceding operating cycle and used as the respective basic value without determining a new basic value. The program is terminated after steps 206, 212 or 214 and is not initiated again until the next time the system is activated.

During operation of the vehicle, the program outlined in FIG. 3 is run through. It is started at predetermined times, entering above-mentioned quantities Sped and Pradi or the brake circuit pressures in a first step 300. In a next step 301, value Sped which is to be processed further is formed on the basis of the basic value determined in step 300 and stored value Spedbas, e.g., on the basis of a difference or a ratio that is formed. Accordingly, the individual wheel brake pressure signal values or brake circuit pressure signal values are formed in step 301. In a next step 302, a check is performed to determine whether the value calculated in step 301 is less than 0 (or less than one when forming the ratio), in other words, whether the displacement signal value thus determined is less than the basic value. If this is the case, then according to step 303, a filter time TFilter is run through (as in steps 204 and 210) and in step 304 the basic value(s) is/are corrected, e.g., by assuming the measured value prevailing at that time as the new basic value. In another embodiment, the basic values are only decremented, so that there is a gradual correction. Then the program is terminated and run through again at the next interval.

If step 302 has shown that the calculated displacement signal is ≧0, then a check is performed in step 306 to determine whether the determined displacement signal is greater than the basic value plus a Δ value (e.g., 0.1 mm) and less than first threshold value Sped0. If this is the case, then according to step 308, the stored basic value is corrected accordingly, in particular the basic values are determined and stored as described above or in another embodiment they are incremented. After step 308, the program is terminated without any change in the basic values in the case of a negative response in step 306.

The situations described here are illustrated further in FIGS. 4 through 7 on the basis of time diagrams, which illustrate brake pedal displacement xHZ (dashed line) and the value of calibrated measured signal U of the displacement sensor (solid line) plotted over time. A threshold value (dotted line) is also shown.

Figure 4:
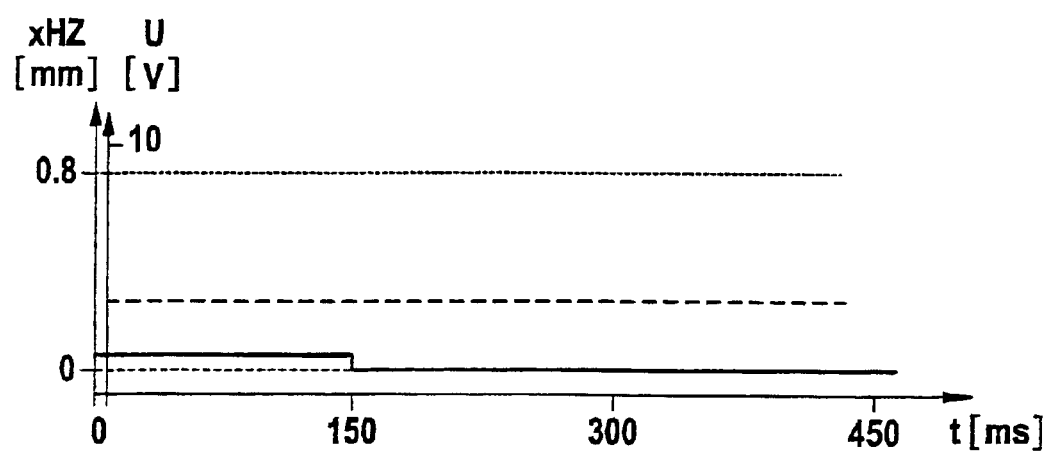
FIG. 4 shows a first time chart illustrating the procedure according to the present invention.

FIG. 4 illustrates a situation in which the brake pedal is not operated on activation of the system (see dashed line). In this case, the algorithm checks on whether the displacement signal is less than the threshold value and if there is no pressure control. If this is the case, then the measured signal (solid line) is set at zero after a filter time of 150 ms, i.e., a corresponding basic value is determined and the displacement signal thus determined is corrected accordingly.

Figure 5:
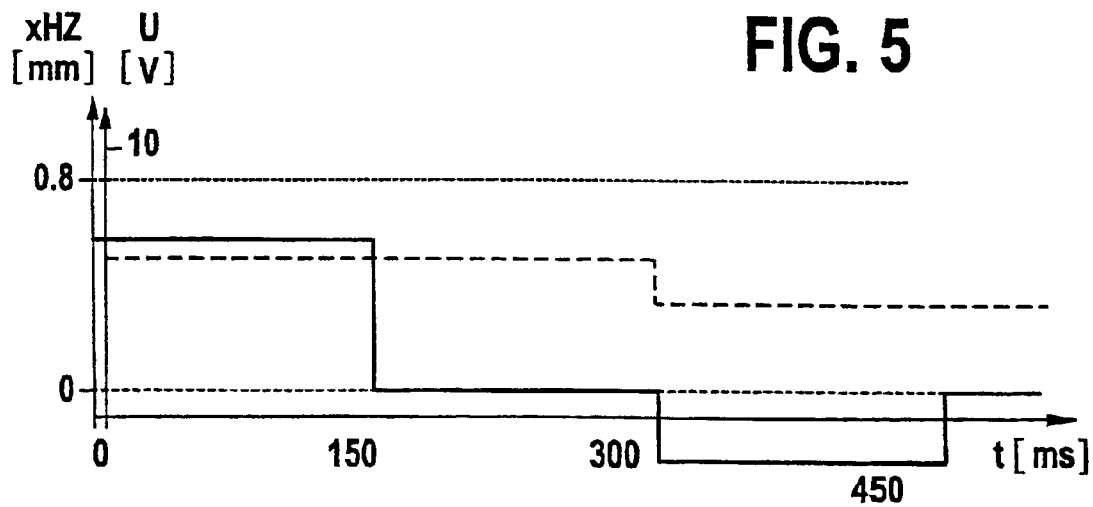
FIG. 5 shows a second time chart illustrating the procedure according to the present invention.

FIG. 5 describes a situation in which the brake pedal is operated on activation of the system, then released after a certain period of time (300 ms here). This measured signal (solid line) here is less than the threshold value. As indicated above, after a filter time of 100 ms has elapsed, a basic value is determined in this case and the measured signal is "set at zero." With retraction of the brake pedal after 300 ms (see dashed line curve), the measured signal assumes negative values. This is detected and the basic value is corrected accordingly after the filter time. Thus, after another 150 ms, the displacement signal is again "set at zero." This situation also occurs when the sensor signal drifts toward smaller values over time due to temperature or aging. This is recognized as negative drift, and the basic value is corrected accordingly.

Figure 6:
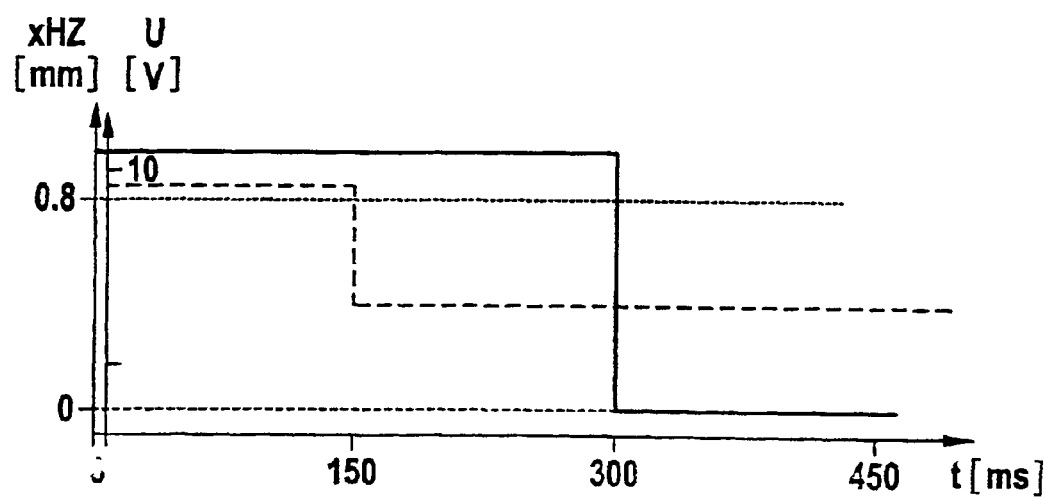
FIG. 6 shows a third time chart illustrating the procedure according to the present invention.

FIG. 6 shows a situation in which the brake pedal is operated on activation of the system above the threshold value. If this is the case, then first no basic value is determined, i.e., there is no "setting at zero" but instead the values already stored from a previous operating cycle are selected. If the driver retracts the pedal (see dashed line at time 150 ms) and if the displacement signal thus falls below the threshold value, then after 150 ms more, a new basic value is determined at time 300 ms, and the displacement signal is set at a value of 0.

Figure 7:
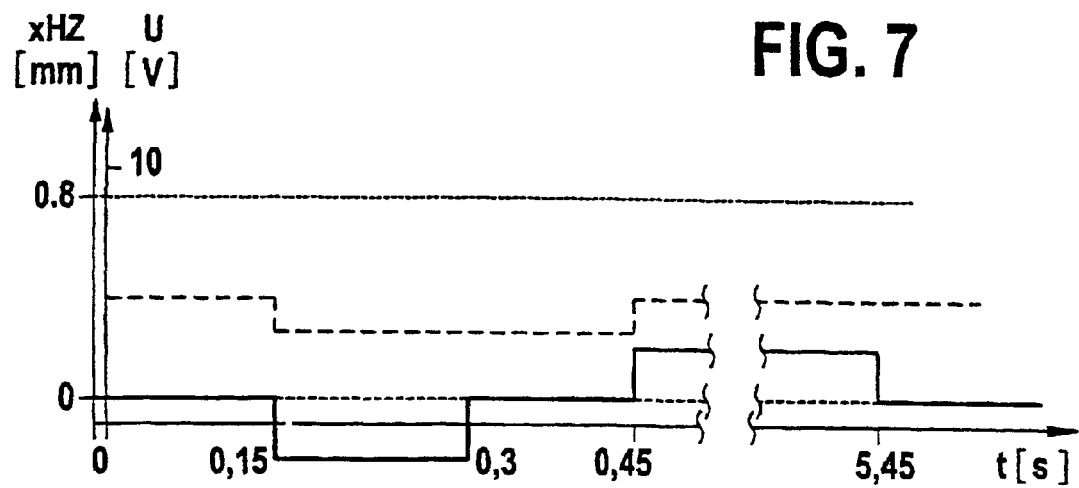
FIG. 7 shows a fourth time chart illustrating the procedure according to the present invention.

FIG. 7 illustrates the special case where the pedal is retracted on activation of the system. After time 0.15 s, the driver pulls the pedal back (dashed line). This leads to the calibrated displacement signal (solid line) becoming negative. After a filter time of 150 ms, a basic value is determined again and the displacement signal is again set at 0, although the brake pedal is still retracted. The basic value then no longer corresponds to the actual situation. Then if the brake pedal returns to its actual zero position (time 0.45 s) a displacement signal greater than 0 is supplied. If this value is between the two threshold values mentioned above, then after a filter time (5 s here) the basic value is again set at zero. This also compensates for a positive drift of the displacement signal.

What is claimed is:

1. A method for calibrating a brake system, comprising:
   predetermining a first threshold value;
   obtaining a zero state value of a measured quantity upon activation of the brake system; and
   establishing a calibrated value of the measured quantity as the zero state value if the zero state value is less then the first threshold value and if no pressure control signal is being output to a wheel brake actuator.

2. The method of claim 1, further comprising:
   predetermining a second threshold value, wherein the second threshold value is higher than the first threshold value; and
   establishing the calibrated value of the measured quantity as the zero state value if the zero state value is greater than the first threshold value and less than the second threshold value.

3. The method of claim 2, further comprising:
   establishing the calibrated value of the measured quantity as a previously determined calibrated value if the zero state value is greater than the second threshold value.

4. A method for calibrating a brake system of a vehicle, comprising:
   predetermining a first threshold value;
   obtaining a measured value of a measured quantity during operation of the vehicle;
   determining a calculated value of the measured quantity as a function of the measured value and a calibrated value; and
   establishing a new value for the calibrated value if the calculated value is less than the first threshold value and if no pressure control signal is being output to a wheel brake actuator.

5. The method of claim 4, wherein the first threshold value is 0.

6. The method of claim 4, farther comprising:
   establishing a new value for the calibrated value if a ratio of the calculated value to the measured value is less than 1 and if no pressure control signal is being output to the wheel brake actuator.

7. The method of claim 4, wherein the new value for the calibrated value is established by obtaining a prevailing value of the measured quantity.

8. The method of claim 4, wherein the new value for the calibrated value is established by decrementing the calibrated value.

9. The method of claim 6, wherein the new value for the calibrated value is established by obtaining a prevailing value of the measured quantity.

10. The method of claim 6, wherein the new value for the calibrated value is established by decrementing the calibrated value.

11. The method of claim 4, further comprising:
    establishing a new value for the calibrated value if:
    a) the measured value is greater than the calibrated value plus a delta value; and
    b) the measured value is less than the first threshold value.

12. A device for calibrating a brake system, comprising:
    an arrangement for predetermining a first threshold value;
    an arrangement for obtaining a zero state value of a measured quantity upon activation of the brake system; and
    an arrangement for establishing a calibrated value of the measured quantity as the zero state value if the zero state value is less then the first threshold value and if no pressure control signal is being output to a wheel brake actuator.

13. The method of claim 12, further comprising:
    an arrangement for predetermining a second threshold value, wherein the second threshold value is higher than the first threshold value; and
    an arrangement for establishing the calibrated value of the measured quantity as the zero state value if the zero state value is greater than the first threshold value and less than the second threshold value.

14. The device of claim 12, further comprising:
    an arrangement for establishing the calibrated value of the measured quantity as a previously determined calibrated value if the zero state value is greater than the second threshold value.

15. A device for calibrating a brake system of a vehicle, comprising:

an arrangement for predetermining a first threshold value;

an arrangement for obtaining a measured value of a measured quantity during operation of the vehicle;

an arrangement for determining a calculated value of the measured quantity as a function of the measured value and a calibrated value; and an arrangement for establishing a new value for the calibrated value if the calculated value is less than the first threshold value and if no pressure control signal is being output to a wheel brake actuator.

* * * * *

UNITED STATES PATENT AND TRADEMARK OFFICE
CERTIFICATE OF CORRECTION

PATENT NO. : 6,802,211 B2
DATED : October 12, 2004
INVENTOR(S) : Hanniel Schmidt It is certified that error appears in the above-identified patent and that said Letters Patent is hereby corrected as shown below:

Column 2,
Line 10, change "the brake line, etc." to -- the brake line (sensor 28), etc. --

Signed and Sealed this

Seventeenth Day of May, 2005

JON W. DUDAS
*Director of the United States Patent and Trademark Office*